May 28, 1968 MASAO NARUSE ET AL 3,385,127

GEARS FORMED OF SHEET METAL AND LIQUIDS

Original Filed March 6, 1963 2 Sheets-Sheet 1

United States Patent Office 3,385,127
Patented May 28, 1968

3,385,127
GEARS FORMED OF SHEET METAL AND LIQUIDS
Masao Naruse, Tokyo, and Takehiko Kumasawa, Kurashiki-shi, Japan, said Kumasawa assignor to Shin-Mitsubishi Jukogyo Kabushiki Kaisha, Tokyo, Japan
Original application Mar. 6, 1963, Ser. No. 263,273, now Patent No. 3,286,329, dated Nov. 22, 1966. Divided and this application Aug. 26, 1966, Ser. No. 575,371
Claims priority, application Japan, Mar. 12, 1962, 37/9,575
9 Claims. (Cl. 74—443)

ABSTRACT OF THE DISCLOSURE

A toothed gear in which there is provided an enclosed space between an outer shell, a portion mounted in the outer shell and side plates; and a liquid filler material in said enclosed space.

This application is a divisional application of our earlier application Ser. No. 263,273 filed Mar. 6, 1963, now Patent No. 3,286,329.

Conventionally, in gears composed of a single material, the treatment for increasing the anti-abrasiveness and strength thereof, such as cementation, nitriding, hardening, etc., when conducted on one part of the gear, has affected the remaining parts of the gear with adverse results.

The present invention relates to a gear which is resistant to such treatment, comprising an outer surface portion of a predetermined thickness defining successive tooth surfaces, tooth crests and bottom lands (hereinafter called "the outer shell"), an inner shell part adapted for engaging a shaft (hereinafter called "the shaft part") and an intermediate part enclosed by said outer shell and said shaft part (hereinafter called "middle part"), which parts are independently composed of different kinds of material, such as anti-abrasive material, lightweight metal, plastic material and liquids, and each of which parts is adapted to its particular quality and physical property requirements.

In the gear according to the present invention, the outer shell and the shaft part are processed separately and filler material is filled in the enclosed space therebetween. Thus, the outer shell and the shaft part can be independently composed of different material and configuration suitable for their respective functions. Further, cementation, nitriding and hardening treatments on the tooth face are not necessary, so that the other parts will not be affected. Accordingly, if a lightweight metal, such as aluminum, is used as a filler material, the weight of the gear may be lightened, and if a plastic, such as, gum of synthetic resin, is used, not only will vibration and noise be avoided but also shock forces will be damped. Moreover, by sealing the side faces of the gear, it is possible to confine a liquid such as oil, glycerin, or the like therewithin.

The process of manufacture of the above gear contemplates the utilizing of impulse energy, to deform a thin plate member of a predetermined thickness to the desired shape of the outer shell, such as by the explosion of an explosive suspended in a liquid or by the discharge between opposed electrodes in a liquid. The outer shell is then concentrically arranged around the shaft part, and filler material is introduced into the space enclosed by said outer shell and said shaft part.

In the process of the present invention, since the outer shell is shaped by action of impulse energy directed onto the plate member, and the filler material is then introduced into the space enclosed by the outer shell and the shaft part, making all members integral, the outer shell, the shaft part and the filler material can be separately and respectively provided with such characteristics and properties as most suitable for each part, and at the same time, precise gears furnishing high performance may be produced easily, quickly and at low cost.

As the plate member of a predetermined thickness is shaped by the action of impulse energy directed thereonto, it is possible to strictly conform the configuration of the plate member to the die, even in case of complicated configuration. Furthermore, in the process of the gear manufacture, the plate member constituting the tooth surface is deformed by impulse energy, and the hardness of the plate member is raised by the effect of the impulse energy.

Accordingly, an object of the present invention is to provide a gear comprised of three parts as abovementioned, which can be easily produced and treated, and each part of which can be independently composed of different materials and configuration suitable for its respective function.

Other objects, features and advantages of the present invention will become apparent from the following description as illustrated in the accompanying drawings, in which.

Figure 1:
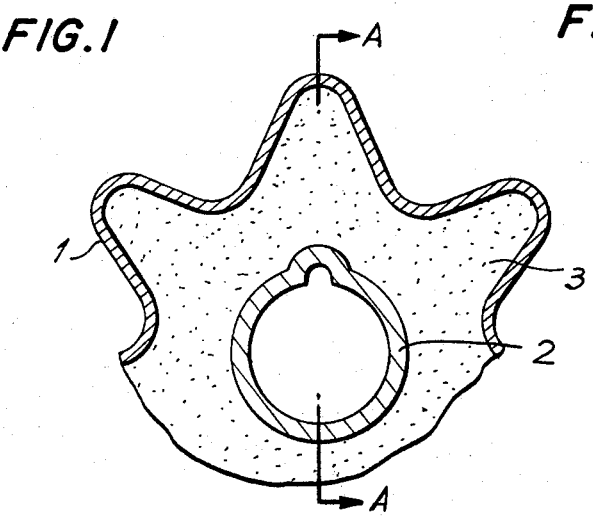
FIGURE 1 is a vertical section of a spur gear according to the present invention taken along lines B—B of FIG. 2.

In FIG. 1, there is shown a spur gear manufactured according to the present invention which comprises an outer shell 1 of cup shape and predetermined thickness, and defining successive tooth surfaces, tooth crests and bottom lands, a shaft part 2 of a predetermined thickness, with a key seat in the form of a recess, adapted for engaging a supporting shaft of the gear, and a middle part 3 enclosed by said outer shell 1 and the shaft part 2.

In the present invention, the outer shell 1 is shaped by impulse energy, as described below in detail. The shaft part 2 also may be shaped by impulse energy in a similar manner as the outer shell 1, but conventionally, it may be formed by a mechanical process. The outer shell 1 and the shaft part 2 are arranged concentrically with each other and then a filler material of metal, synthetic resin or the like is filled in the enclosed space between the shell 1 and the part 2 thus forming an integral gear. When the filler material is a liquid, side plates $P_1$ and $P_2$ are secured to the sides of the shell 1 and the part 2 to seal the liquid in the enclosed space between the shell 1 and the part 2.

Figure 3:
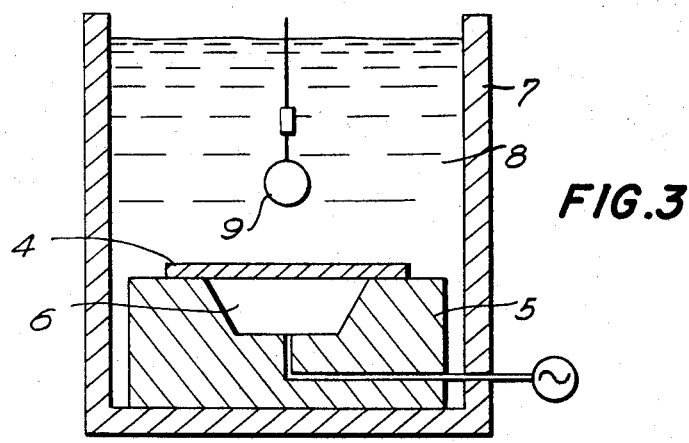
FIGURES 3–5 are respectively cross-sections of apparatus for shaping an outer shell of the gear.
Figure 4:
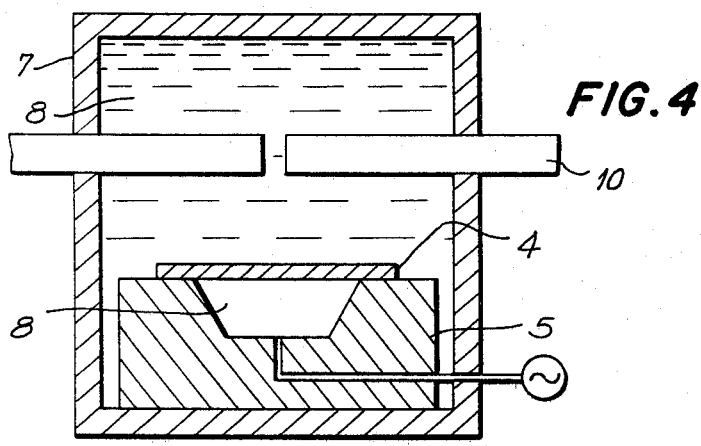
Figure 5:
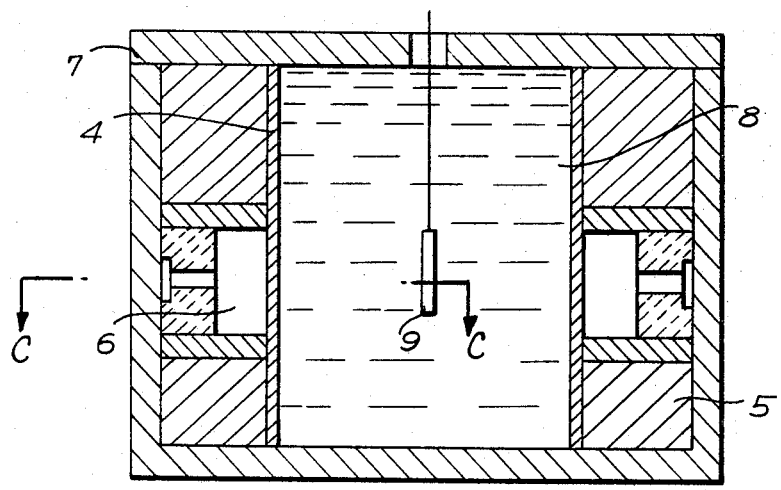

As shown in FIGS. 3, 4 and 5, in the formation of the outer shell 1, a recess 6 of a die 5 is covered in sealing relation therewith by a thin plate 4 suitable as the gear outer shell. The recess 6 is evacuated by a vacuum pump or the like, and the die and plate is immersed into a liquid 8 in a liquid tub 7. Then, as shown in FIGS. 3 and 5 an explosive 9 suspended in the liquid 8 is exploded, or as shown in FIG. 4, opposed electrodes 10 in the liquid 8 are discharged. Impulse energy generated by explosion of the explosive or by discharge between the electrodes is converted into liquid pressure and, acting on the thin plate, causes it to be pressed against the die and conform to the shape thereof.

Figure 2:
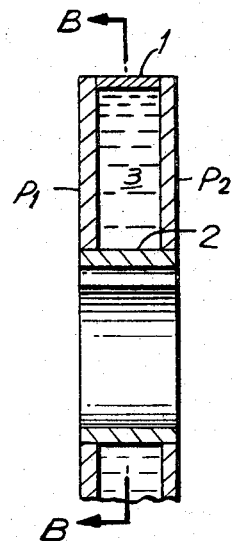
FIGURE 2 is a section taken along lines A—A of FIG. 1.

Of course, the dies can be altered according to the tooth number, configuration and kind of gear to be manufactured. However, in the case of a spur gear as shown in FIGS. 1 and 2, a die such as that shown in FIG. 6 is used.

Figure 6:
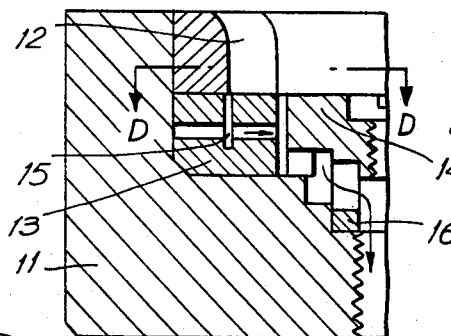
FIGURES 6 and 7 are respectively cross-sections of a die used in the above apparatus for shaping the outer shell to the gear.
Figure 8:
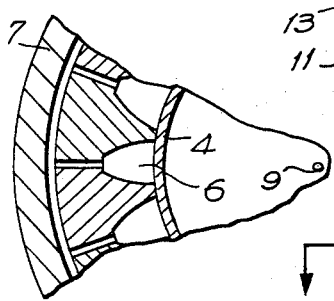
FIGURE 8 is a cross-section taken along lines C—C in FIG. 5.

In FIG. 6, 11 is a main die, 12 is a tooth die corresponding to the desired number of teeth and configuration of the gear, said die being carried on the main die 11. 13 and 14 are respectively a ring and a bottom shaping die, which are replaceable in accordance with the face width of the gear and on which air purge 15 is provided. 16 is an auxiliary ring.

Figure 7:
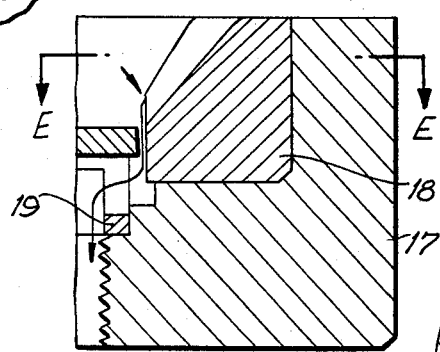
Figure 9:
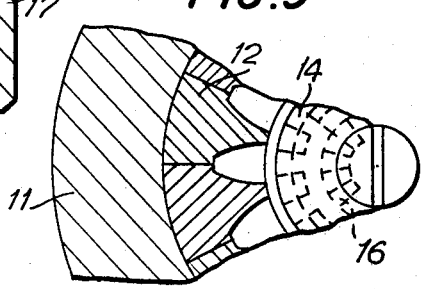
FIGURE 9 is a cross-section taken along lines D—D in FIG. 6.
Figure 10:
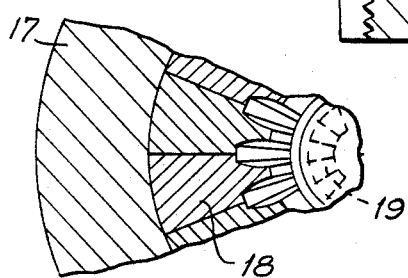
FIGURE 10 is a cross-section taken along lines E—E in FIG. 7.

In the manufacture of a bevel gear, a die such as that shown in FIG. 7 may be employed. In FIG. 7, 17 is the main die, 18 is a tooth die selected according to face width, tooth number and configuration of a desired gear. 19 is an auxiliary ring.

If the apparatus of FIG. 4 is used in the manufacture of a spur gear, a die having an annular tooth die divisible to any number may be covered by a cylindrical thin plate member in sealing relation therewith.

Since the metal member is shaped by impulse energy which is discharged in an extremely short time, the impulse pressure is very high, and the elongation rate of the machined metal member is high and elastic return slight.

Accordingly, in shaping metal by impulse energy, utilization of a precise die enables it to strictly conform to the die, even in the case of complicated configuration.

Further, by means of impulse energy, hard and anti-abrasive material, such as nickel, may be easily shaped as required.

Furthermore, in the impulse energy operation, the hardness of the part acted thereby will be further raised.

Consequently, in the present invention, since the outer shell is shaped by impulse energy, even in the case of complicated configuration, as in the case of a gear shell, precise, easy, and quick effffects at low cost will result, and moreover, hard and anti-abrasive material, such as nickel and the like, may be utilized for the gear outer shell. Further, as the outer shell is hardened by impulse energy and the tooth surface part in particular is further hardened under the treatment, desirable properties and performance for a gear may be obtained, without a prior treatment of cementation, nitriding, harding, etc.

In the present invention, since the outer shell and the shaft part are processed separately and the filler material is filled in the enclosed part therebetween, making them integral, the outer shell and the shaft part can be independently composed of different material suitable for the respective parts. Further, as cementation, nitriding and hardening treatment on the tooth face are not necessary, the other parts will never be affected. Accordingly, if light metal, such as aluminum, is used as the filler material, the weight of gear may be reduced, and if a plastic material, such as gum or synthetic resin, is used, not only will vibration and noise be avoided but also shock forces will be damped. Furthermore, by sealing the side faces of the gear, it is possible to use a liquid such as oil, glycerin, etc, as the filler material.

As abovementioned, in the present invention, since the outer shell is shaped by the action of impulse energy directly on the thin plate member, and the filler material is then introduced into the space enclosed by the outer shell and the shaft part, making all members integral, the outer shell, the shaft part and the middle part can be separately and respectively provided with such characteristics and properties as most suitable for each part, and at the same time, precise gears of high performance may be produced easily, quickly and at low cost.

There will now be obvious to those skilled in the art many modifications and variations of the invention set forth. These modifications and variations will not however depart from the scope of the invention as long as they lie within the bounds of the following claims.

What is claimed is:

1. A gear comprising an outer shell of a predetermined thickness defining a gear tooth surface, a portion mounted within said outer shell for engagement with a supporting shaft, side plates on said shell and said portion defining therewith an enclosed space, and a liquid filler material confined in said enclosed space.

2. A gear as claimed in claim 1 wherein said liquid filler material is oil.

3. A gear as claimed in claim 2 wherein said portion and said outer shell are concentric.

4. A gear as claimed in claim 3 wherein said portion includes a deformed part defining a recess constituting a seat for a key on said shaft.

5. A gear as claimed in claim 2 wherein said outer shell is a one-piece continuous element.

6. A gear as claimed in claim 5 wherein said outer shell is work-hardened.

7. A gear as claimed in claim 2 wherein said outer shell is constituted of nickel.

8. A gear as claimed in claim 2 wherein said outer shell and said portion are constituted of different materials.

9. A gear as claimed in claim 1, wherein said liquid is glycerin.

References Cited

UNITED STATES PATENTS

| | | | |
|---|---|---|---|
| 820,789 | 5/1906 | Hutchins | 74—443 |
| 1,185,953 | 6/1916 | Sundh | 74—443 |
| 1,375,688 | 4/1921 | Friz | 74—443 |
| 1,638,118 | 8/1927 | Ford | 74—443 |
| 1,819,266 | 8/1931 | Rued | 74—443 |
| 3,069,918 | 12/1962 | Schultz | 74—230.4 |

FRED C. MATTERN, Jr., *Primary Examiner.*

LEONARD H. GERIN, *Examiner.*